US012674739B2

(12) United States Patent (10) Patent No.: US 12,674,739 B2
Chen et al. (45) Date of Patent: Jul. 7, 2026

(54) FLOW CYTOMETER ALIGNMENT

(71) Applicant: Beckman Coulter, Inc., Brea, CA (US)

(72) Inventors: Antao Chen, Palmetto Bay, FL (US);
Eric Statler, Davie, FL (US)

(73) Assignee: Beckman Coulter, Inc., Brea, CA (US)

( * ) Notice: Subject to any disclaimer, the term of this
patent is extended or adjusted under 35
U.S.C. 154(b) by 112 days.

(21) Appl. No.: 18/707,140

(22) PCT Filed: Sep. 22, 2022

(86) PCT No.: PCT/US2022/044344
§ 371 (c)(1),
(2) Date: May 2, 2024

(87) PCT Pub. No.: WO2023/086163
PCT Pub. Date: May 19, 2023

(65) Prior Publication Data
US 2025/0035534 A1 Jan. 30, 2025

Related U.S. Application Data

(60) Provisional application No. 63/336,567, filed on Apr.
29, 2022, provisional application No. 63/277,473,
filed on Nov. 9, 2021.

(51) Int. Cl.
*G01N 15/14* (2024.01)
*G01N 15/1434* (2024.01)
*G01N 15/149* (2024.01)
*G01N 15/10* (2006.01)

(52) U.S. Cl.
CPC ....... *G01N 15/1434* (2013.01); *G01N 15/149*
(2024.01); *G01N 2015/1006* (2013.01); *G01N
2015/1452* (2013.01)

(58) Field of Classification Search
CPC ............. G01N 15/1434; G01N 15/149; G01N
2015/1006; G01N 2015/1452
See application file for complete search history.

(56) References Cited

U.S. PATENT DOCUMENTS

| | | | |
|---|---|---|---|
| 7,024,316 B1 | 4/2006 | Ellison et al. | |
| 7,215,425 B2 * | 5/2007 | Rezachek | G01N 15/1456 356/399 |
| 7,590,500 B2 | 9/2009 | Jochum et al. | |
| 7,691,636 B2 | 4/2010 | Frazier et al. | |

(Continued)

OTHER PUBLICATIONS

International Search Report and Written Opinion for International
Patent Appl. No. PCT/US2022/0044344 (Jan. 20, 2022).

*Primary Examiner* — Kevin K Pyo
(74) *Attorney, Agent, or Firm* — Merchant & Gould P.C.

(57) ABSTRACT

A sorting flow cytometer receives a current alignment of a
light beam, determines a difference between the current
alignment of the light beam and a target alignment of the
light beam, and calculates one or more voltage values based
on the difference between the current alignment and the
target alignment. The sorting flow cytometer uses the volt-
age values to adjust a position of at least one of a first
alignment actuator extending in a first axial direction and a
second alignment actuator extending in a axial second
direction to reduce the difference between the current align-
ment of the light beam and the target alignment of the light
beam.

7 Claims, 15 Drawing Sheets

(56)  References Cited

U.S. PATENT DOCUMENTS

| 7,945,428 | B2 | 5/2011 | Fox et al. |
| 8,290,625 | B2 | 10/2012 | Degeal et al. |
| 8,290,751 | B2 | 10/2012 | Fox et al. |
| 8,754,390 | B2 | 6/2014 | Lofstrom et al. |
| 8,889,072 | B2 | 11/2014 | Degeal et al. |
| 8,922,646 | B2 | 12/2014 | Neckels et al. |
| 9,134,220 | B2 | 9/2015 | Malachowski et al. |
| 9,243,995 | B2 | 1/2016 | Fox et al. |
| 9,448,157 | B2 * | 9/2016 | Ito ........................ G01N 15/147 |
| 9,625,367 | B2 | 4/2017 | Malachowski et al. |
| 9,816,911 | B2 | 11/2017 | Chen et al. |
| 9,835,541 | B2 | 12/2017 | Malachowski et al. |
| 9,885,603 | B2 | 2/2018 | Morrell et al. |
| 10,101,260 | B2 | 10/2018 | Reed et al. |
| 10,132,678 | B2 | 11/2018 | Morrell et al. |
| 10,190,959 | B2 | 1/2019 | Thrasher et al. |
| 10,473,519 | B2 | 11/2019 | Morrell et al. |
| 10,495,562 | B2 | 12/2019 | Malachowski et al. |
| 2005/0078299 | A1 | 4/2005 | Fritz et al. |
| 2013/0208330 | A1 | 8/2013 | Naono |
| 2019/0025573 | A1 | 1/2019 | Aleksov et al. |

* cited by examiner

800

Receive Current Alignment — 802

Determine Difference from Target Alignment — 804

Calculate Voltage Valuess — 806

Send Voltage Values to Alignment Module — 808

1300

1302
Adjust Position of Actuators Based on Previously Stored Voltage Values

1304
Determine Current Alignment

1306
Determine Difference from Target Alignment

1308
Determine New Voltage Values

1310
Adjust Position of Actuators Based on New Voltage Values

FLOW CYTOMETER ALIGNMENT

CROSS-REFERENCE TO RELATED APPLICATIONS

This application is a U.S. National Stage Application of PCT/US2022/044344, filed on Sep. 22, 2022, which claims the benefit of and priority to U.S. Provisional Patent Application No. 63/277,473, filed on Nov. 9, 2021, and U.S. Provisional Patent Application No. 63/336,567, filed on Apr. 29, 2022, the contents of which are incorporated herein by reference in their entireties. To the extent appropriate, a claim of priority is made to each of the above-disclosed applications.

BACKGROUND

In flow cytometry, particles such as cells are arranged in a sample stream to pass typically one-by-one through one or more excitation light beams with which the particles interact. Light scattered or emitted by the particles upon interaction with the one or more excitation beams is collected, detected, and analyzed to characterize and differentiate the particles. For example, scattering of the one or more excitation beams may provide information about particle size, particle internal structure or complexity, and fluorescence excited by the one or more excitation beams may provide information about the presence or absence in the particles of fluorophores correlating with particular chemical or biological properties.

In a sorting flow cytometer, particles may be extracted out of the sample stream after having been characterized by their interaction with the one or more excitation beams, and thereby sorted into different groups. Such sorting may utilize, for example, gas jets, electrostatic forces, or other methods to displace selected particles from the sample stream.

The performance of flow cytometers may be limited, for example, by the efficiency with which they collect light scattered or emitted by the particles, by susceptibility to misalignment of the optical components, and by the difficulty with which optical components such as light sources or light detectors, for example, may be replaced or substituted without significantly misaligning or otherwise disrupting the operation of the instrument.

SUMMARY

In general terms, the present disclosure relates to configurations and methods useful in particle analyzers and particle analysis, and more particularly to flow cytometers and flow cytometry employing such configurations and methods. Various aspects are described in this disclosure, which include, but are not limited to, the following aspects.

In one aspect, a sorting flow cytometer comprises a light source configured to generate a light beam for measuring at least one characteristic of a particle arranged in a fluid stream; an alignment module configured to adjust an alignment of the light beam from the light source, the alignment module including: a first alignment actuator extending in a first axial direction; a second alignment actuator extending in a second axial direction; a mirror attached to at least one of the first and second alignment actuators, the mirror configured to reflect the light beam generated from the light source; a beam splitter configured to reflect a portion of the light beam received from the mirror, and the beam splitter being configured to allow a remaining portion of the light beam received from the mirror to pass through; and a position sensor configured to receive the portion of the light beam reflected from the beam splitter to determine a current alignment of the light beam; and a controller including: at least one processing device; and at least one memory device storing software instructions that, when executed by the at least one processing device, cause the controller to: receive the current alignment of the light beam from the position sensor; determine a difference between the current alignment of the light beam and a target alignment of the light beam; calculate one or more voltage values based on the difference between the current alignment of the light beam and the target alignment of the light beam; and send the one or more voltage values to the alignment module to adjust a position of at least one of the first and second alignment actuators to reduce the difference between the current and target alignments of the light beam.

Another aspect relates to a method of aligning a light beam in a sorting flow cytometer. The method comprises receiving a current alignment of a light beam; determining a difference between the current alignment of the light beam and a target alignment of the light beam in at least one of first and second axial directions; calculating one or more voltage values based on the difference between the current alignment of the light beam and the target alignment of the light beam; and using the one or more voltage values to adjust a position of at least one of a first alignment actuator extending in the first axial direction and a second alignment actuator extending in the second axial direction to reduce the difference between the current alignment of the light beam and the target alignment of the light beam.

Another aspect relates to a controller for a sorting flow cytometer. The controller comprises at least one processing device; and at least one computer readable data storage device storing software instructions that, when executed by the at least one processing device, cause the controller to: receive a current alignment of a light beam; determine a difference between the current alignment of the light beam and a target alignment of the light beam in at least one of first and second axial directions; generate one or more voltage values based on the difference between the current alignment of the light beam and the target alignment of the light beam; and use the one or more voltage values to adjust a position of at least one of a first alignment actuator extending in the first axial direction and a second alignment actuator extending in the axial second direction to reduce the difference between the current alignment of the light beam and the target alignment of the light beam.

Another aspect relates to an alignment module for adjusting an alignment of a light beam from a light source inside a sorting flow cytometer. The alignment module comprises a first alignment actuator having a fixed end and a free end extending in a first axial direction, the fixed end of the first alignment actuator configured to receive a first voltage to adjust a position of the first alignment actuator orthogonal to the first axial direction; a second alignment actuator having a fixed end and a free end extending in a second axial direction, the second axial direction being orthogonal to the first axial direction, and the fixed end of the second alignment actuator configured to receive a second voltage to adjust a position of the second alignment actuator orthogonal to the second axial direction; and a mirror attached to at least one of the first and second alignment actuators, the mirror configured to reflect the light beam generated from the light source.

Another aspect relates to a method of aligning a light beam in a sorting flow cytometer. The method comprises adjusting a position of one or more actuators based on previously stored voltage values, the one or more actuators guiding an alignment of a light beam; receiving feedback on a current alignment of the light beam; calculating a difference between the current alignment of the light beam and a target alignment of the light beam; determining new voltage values for adjusting the position of the one or more actuators based on the difference between the current alignment and the target alignment; and adjusting the position of the one or more actuators based on the new voltage values to reduce the difference between the current alignment and the target alignment.

Another aspect relates to a method of aligning a light beam in a sorting flow cytometer, the method comprising determining when a user completes alignment adjustment of the light beam; determining whether the alignment adjustment is stored in a memory of the sorting flow cytometer; and when the alignment adjustment is not stored in the memory of the sorting flow cytometer, storing the alignment adjustment in the memory of the sorting flow cytometer without user input.

DESCRIPTION OF THE FIGURES

The following drawing figures, which form a part of this application, are illustrative of the described technology and are not meant to limit the scope of the disclosure in any manner.

4

Figure 14:
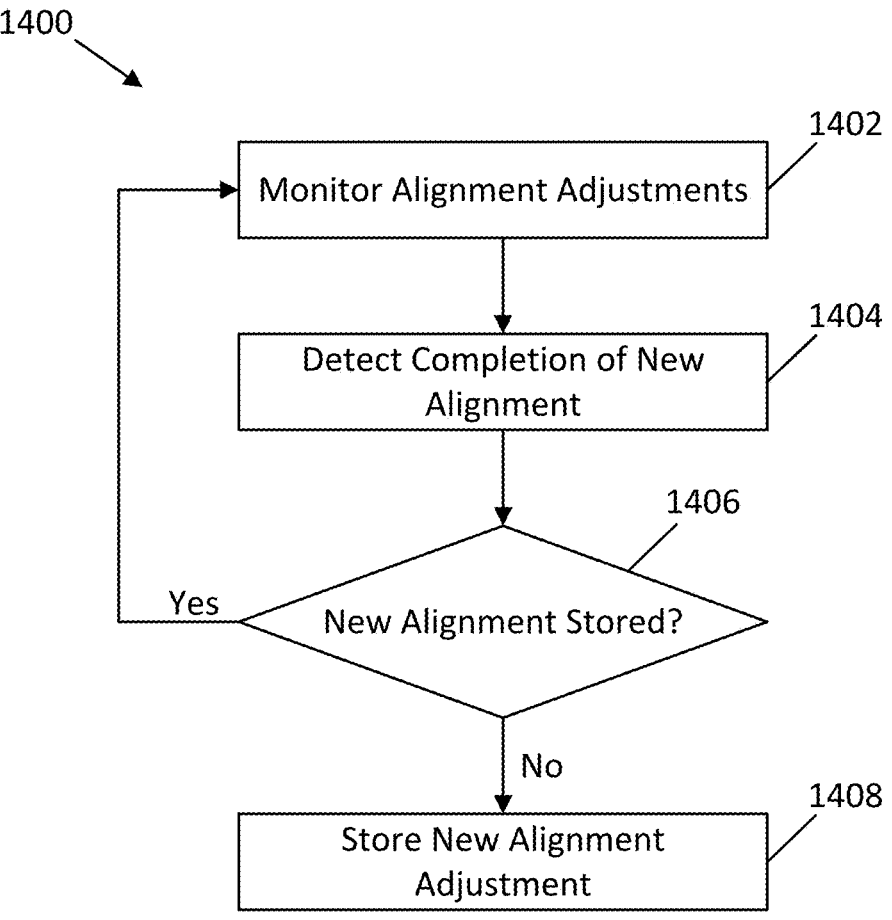
FIG. 14 illustrates a method of storing a new alignment of the light beam emitted from the light source of the sorting flow cytometer of FIG. 3
Figure 15:
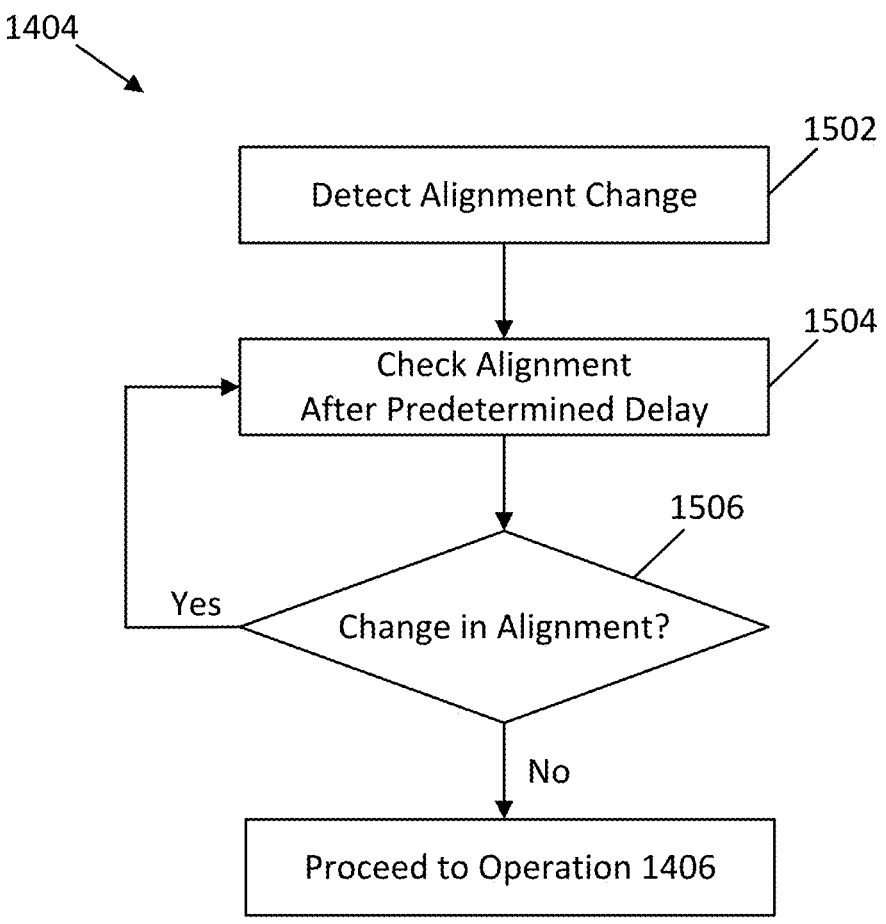

FIG. 15 illustrates an example of an operation of detecting completion of a new alignment in the method of FIG. 14.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
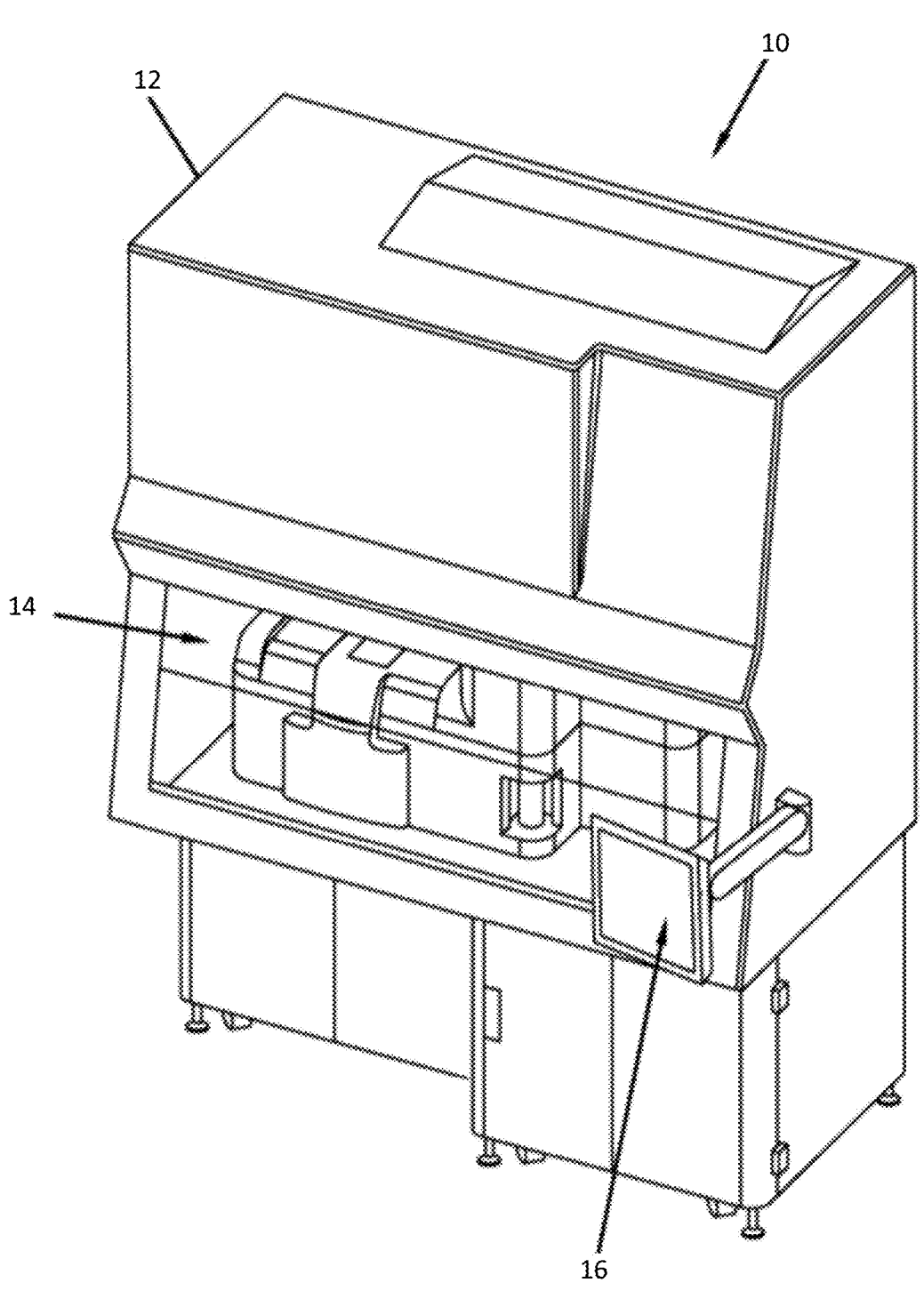
FIG. 1 is a perspective view of an example of a flow cytometer system including a sorting flow cytometer.

FIG. 1 is a perspective view of an example of a flow cytometer system 10. In this example, the flow cytometer system 10 includes a containment hood 12 and a sorting flow cytometer 14. Additionally, the flow cytometer system 10 can also include a display 16.

In the example shown in FIG. 1, the sorting flow cytometer 14 is arranged within the containment hood 12. In alternative examples, the flow cytometer system 10 does not include a containment hood 12 such that the containment hood 12 is optional.

The sorting flow cytometer 14 is a device configured to evaluate the contents of a fluid, and to sort the contents into multiple different containers, based on detected characteristics. An example of the sorting flow cytometer 14 is illustrated in more detail in FIG. 2.

Figure 2:
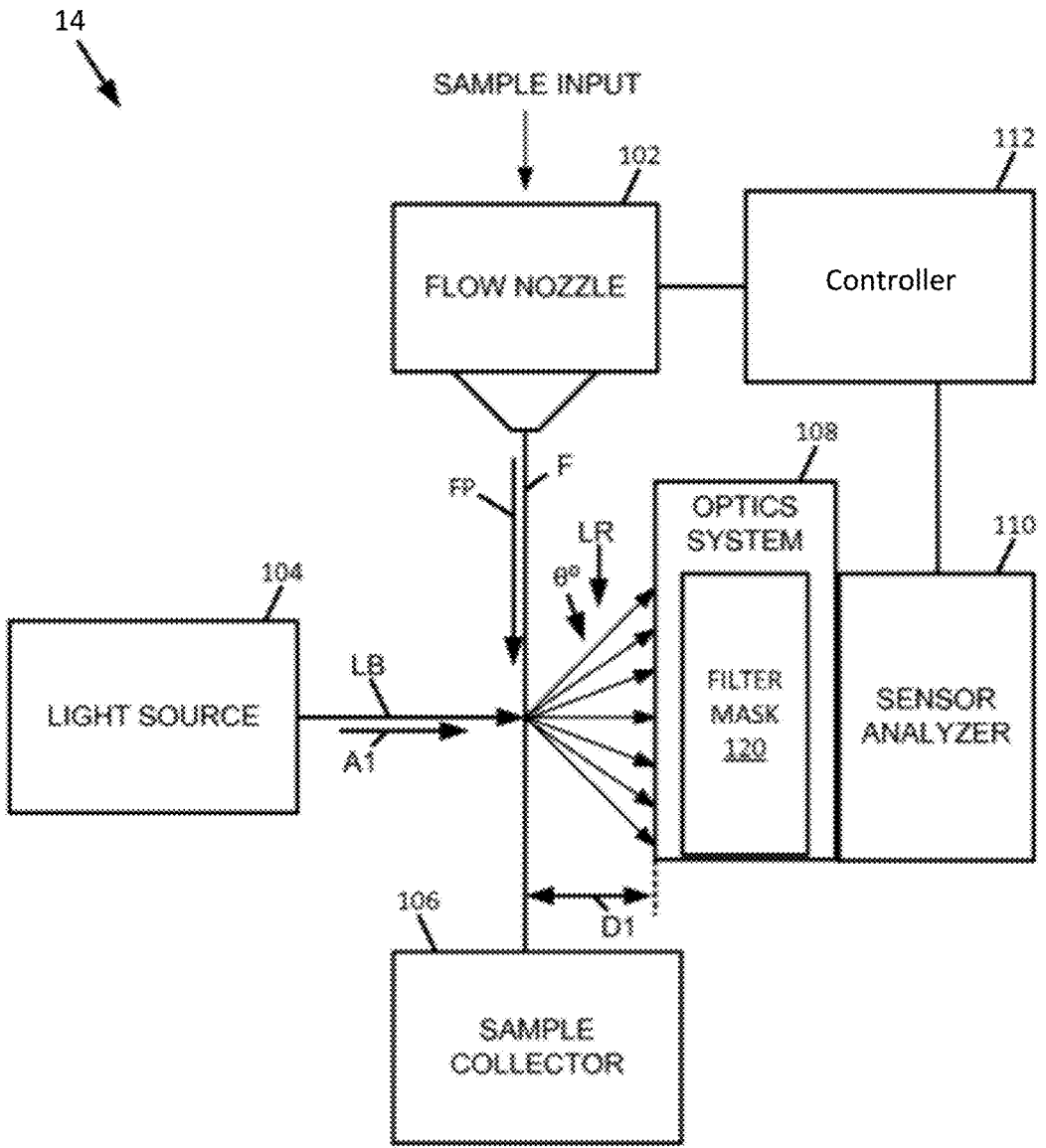
FIG. 2 is a schematic diagram of an example of the sorting flow cytometer of FIG. 1.

FIG. 2 is a schematic block diagram of an example of the sorting flow cytometer 14. The sorting flow cytometer 14 includes a flow nozzle 102, a light source 104, a sample collector 106, an optics system 108, a sensor analyzer 110, and a controller 112. In the example embodiment shown in FIG. 2, the optics system 108 includes a filter mask 120.

The flow nozzle 102 receives a sample containing particles for analysis by the sorting flow cytometer 14. The flow nozzle 102 has a small aperture that permits only one or a small number of particles to pass through at a time, such as to arrange the particles so that they pass through the flow nozzle 102 in single file, for example. Examples of flow nozzles 102 include a flow cell and a jet-in-air nozzle. Additional types of flow nozzles may also be used.

In some examples, the flow cell includes a transparent body including a microscopically thin channel. The fluid stream containing the particles is directed by the walls of the channel along the fluid path extending through the flow cell and past the light source 104. In other examples, a jet-in-air nozzle is used to eject the fluid stream along the fluid path. Hydrodynamic forces cause the fluid to flow in a continuous fluid stream and confine the particles as they pass the light source 104 inside the sorting flow cytometer 14.

The sample is mixed with a sheath fluid, and a resulting fluid steam F containing the sample is directed along a flow path FP. The sample can be of a variety of different types of particles, and can include multiple types of particles within a single sample. Examples of the types of particles in the sample can include, without limitation, beads, blood, bacteria, yeast, plankton, microparticles (e.g., from plasma membrane of cells), mitochondria, and the like.

The light source 104 generates a light beam LB for measuring at least one characteristic of a particle arranged in the fluid steam F. An example of a light source 104 is a laser, which generates a laser beam. Other embodiments use other light sources, such as an arc lamp. The light beam LB is directed to the fluid steam F in a direction A1 where the light beam LB enters the fluid. The light beam LB is directed by one or more optic devices, such as lenses, mirrors, prisms, and the like after the light beam is emitted from the light source 104.

The fluid stream F is directed to a sample collector 106 after proceeding along the flow path FP. The sample collector 106 can include one or more storage receptacles, and the sample collector 106 operates to sort the particles in the fluid into the storage receptacles based on one or more characteristics of the particles detected by the optics system 108.

When the light beam LB enters the fluid stream F, at least some of the light rays LR are radiated (e.g., forward, side, or back) by the particles within the fluid. Some of these light rays are forward-scattered, as shown in FIG. 2, while other light rays are side-scattered and back-scattered. Fluorescent light is also generated, which can also radiate in forward, side, or backward directions. A radiation angle θ (sometimes also referred to as a scatter angle) is the angle of a light ray LR relative to the direction A1 of the light beam LB after being scattered or fluoresced by the fluid stream F. Because the light beam LB includes many light rays LR that can be separately radiated in different directions, different light rays LR can be radiated in different directions having different radiation angles θ simultaneously. While FIG. 2 illustrates a vertical radiation angle θ, the light rays LR can also be radiated in a horizontal dimension.

The optics system 108 is positioned adjacent the flow path FP to receive the radiated light rays LR. In some examples, the optics system 108 includes a filter mask 120. The filter mask 120 is arranged and configured to block a portion of the light rays LR having certain radiation angles θ and to pass another portion of the light rays having different radiation angles θ.

At least a portion of the optics system 108 is arranged adjacent the flow path FP. In the example illustrated in FIG. 2, the optics system 108 is positioned a distance D1 away from the flow path FP. Different embodiments can have different distances D1. Some embodiments have a distance D1 in a range from about 10 mm to about 15 mm, for example.

After the light rays LR pass through the optics system 108, they are detected by the sensor analyzer 110. The sensor analyzer 110 detects various characteristics of the light rays, such as one or more of the magnitude and position of the detected light, time duration of the light pulse as a particle traverses the light beam, the shape of the pulse, polarization, and wavelength.

The controller 112 receives signals and data from the sensor analyzer 110 to evaluate characteristics of the particles in the fluid. In some embodiments, the controller 112 includes a display, and generates a user interface on the display to convey information regarding the characteristics of the particles in the fluid to a user. The controller 112 includes at least one processing device (such as a central processing unit) and at least some form of computer readable media, such as a computer readable data storage device.

In example illustrated in FIG. 2, the sorting flow cytometer 14 is a sorting flow cytometer in which the controller 112 operate to sort particles into multiple different receptacles in the sample collector 106 based at least in part on the forward-radiated light detected by the sensor analyzer 110. For example, drops of the fluid are selectively charged by the flow nozzle 102 prior to separation from the fluid stream at the flow nozzle 102 based on detected characteristics of the particles contained in the drops. The drops are then sorted into different receptacles by passing the drops through charged plates at the sample collector 106. The charged plates deflect the drops into the appropriate receptacles.

Figure 3:
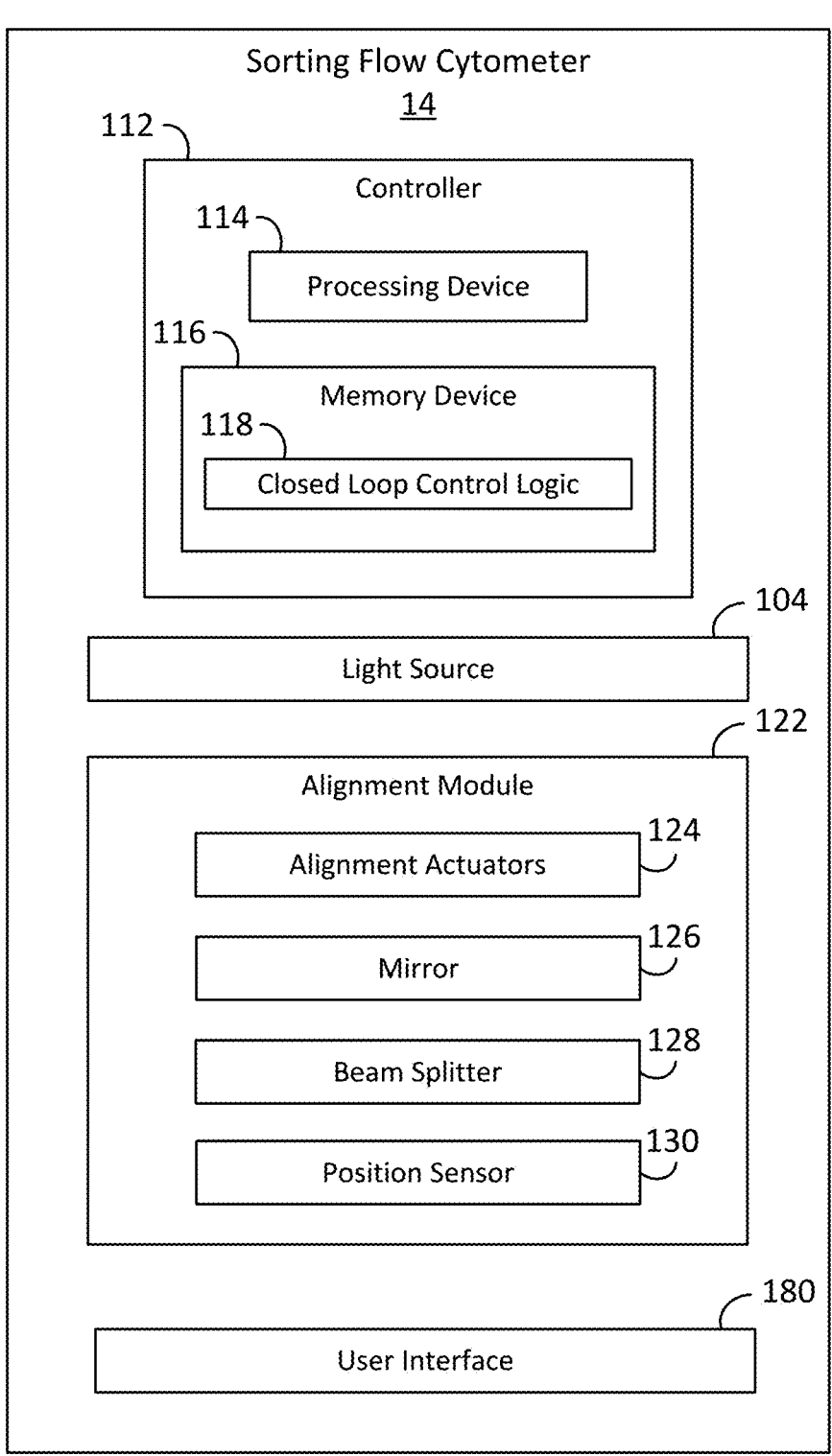
FIG. 3 is another schematic diagram of an example of the sorting flow cytometer of FIG. 1, the sorting flow cytometer including an alignment module for adjusting an alignment of a light beam emitted from a light source of the sorting flow cytometer.

FIG. 3 is another schematic diagram of the sorting flow cytometer 14. In FIG. 3, the sorting flow cytometer 14 includes an alignment module 122 for adjusting an alignment of the light beam LB emitted from the light source 104 of the sorting flow cytometer 14.

As described above, the sorting flow cytometer 14 includes the controller 112, which includes at least one processing device 114 and a memory device 116. The processing device 114 is an example of a processing unit such as a central processing unit (CPU). The processing device 114 can include one or more central processing units (CPU). In some examples, the processing device 114 is a microcontroller that can include one or more digital signal processors, field-programmable gate arrays, and other types of circuits.

The memory device 116 operates to store data and instructions for execution by the processing device 114, including closed loop control logic 118, which is described in more detail below. The memory device 116 includes computer-readable media, which may include any media that can be accessed by the processing device 114. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media can include, but is not limited to, random access memory, read only memory, electrically erasable programmable read only memory, flash memory, and other memory technology, including any medium that can be used to store information that can be accessed by the processing device 114. The computer readable storage media is non-transitory.

Computer readable communication media embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are within the scope of computer readable media.

The sorting flow cytometer 14 includes the light source 104, and the alignment module 122 for adjusting the alignment of the light beam LB emitted from the light source 104. As shown in FIG. 3, the alignment module 122 includes one or more alignment actuators 124, a mirror 126, a beam splitter 128, and a position sensor 130. Also, the sorting flow cytometer 14 further includes a user interface 180, which is described in more detail in FIGS. 11 and 12.

Figure 4:
FIG. 4 is a perspective view of an embodiment of the alignment module of FIG. 3 relative to the light source of the sorting flow cytometer.

FIG. 4 is a perspective view of the alignment module 122 relative to the light source 104 of the sorting flow cytometer 14. In this example, a base 18 of the sorting flow cytometer 14 includes a platform 132 on which the light source 104 and the alignment module 122 are mounted thereon. The base 18 may be a part of the housing of the sorting flow cytometer 14.

In this example, the light source 104 is mounted to a heat sink 134, and the heat sink 134 is mounted to the platform 132. The heat sink 134 dissipates heat emitted from the light source 104 as result of the light source 104 generating the light beam LB.

A safety shutter 136 is mounted in front of the light source 104. The safety shutter 136 is used to physically block the light beam LB from the light source 104 when the top cover of the housing of the sorting flow cytometer 14 is open. The safety shutter ensures that the light beam LB is blocked when the sorting flow cytometer 14 is being serviced during maintenance.

As further shown in FIG. 4, the alignment module 122 includes first and second alignment actuators 124a, 124b, and the mirror 126 is attached to at least one of the first and second alignment actuators 124a, 124b. The mirror 126 is positioned in the path of the light beam LB emitted from the light source 104, and reflects the light beam LB to the beam splitter 128. In the example shown in FIG. 4, the first and second alignment actuators 124a, 124b are mounted to the platform 132. The first and second alignment actuators 124a, 124b and the mirror 126 will be described in more detail below with reference to FIGS. 5-7.

The beam splitter 128 reflects a portion of the light beam LB received from the mirror 126 to the position sensor 130, and the beam splitter 128 allows a remaining portion of the light beam LB received from the mirror 126 to pass through to a beam collector 140. In some examples, the beam splitter 128 reflects about 1-4% of the light beam LB to the position sensor 130. In this example, the position sensor 130 is an optical sensor that uses the reflected portion of the light beam LB to determine the alignment of the light beam LB emitted from the light source 104. In the example shown in FIG. 4, the beam splitter 128 is also attached to the platform 132.

The remaining portion of the light beam LB (e.g., 96%-99%) that passes through the beam splitter 128 is received by the beam collector 140, which can combine the light beam LB with one or more additional light beams generated by additional light sources in the sorting flow cytometer 14. In the example shown in FIG. 4, the beam collector 140 combines the light beam LB with a secondary light beam $LB_0$ that is generated by a second light source 138. While two light sources (e.g., the light source 104 and second light source 138) are shown in the example of the sorting flow cytometer 14 depicted in FIG. 4, it is contemplated that the sorting flow cytometer 14 can include a plurality of light sources, such as more than two light sources.

The beam collector 140 directs the combined light beams $LB_c$ into the fluid steam F of the sample (see FIG. 2). This causes the particles in the fluid steam F to radiate at least some of the light rays LR (e.g., forward, side, or back) toward the optics system 108 for collection. As described above, the radiated light rays are analyzed by the controller 112 for sorting the particles in the sample into one or more storage receptacles in the sample collector 106.

Figure 5:
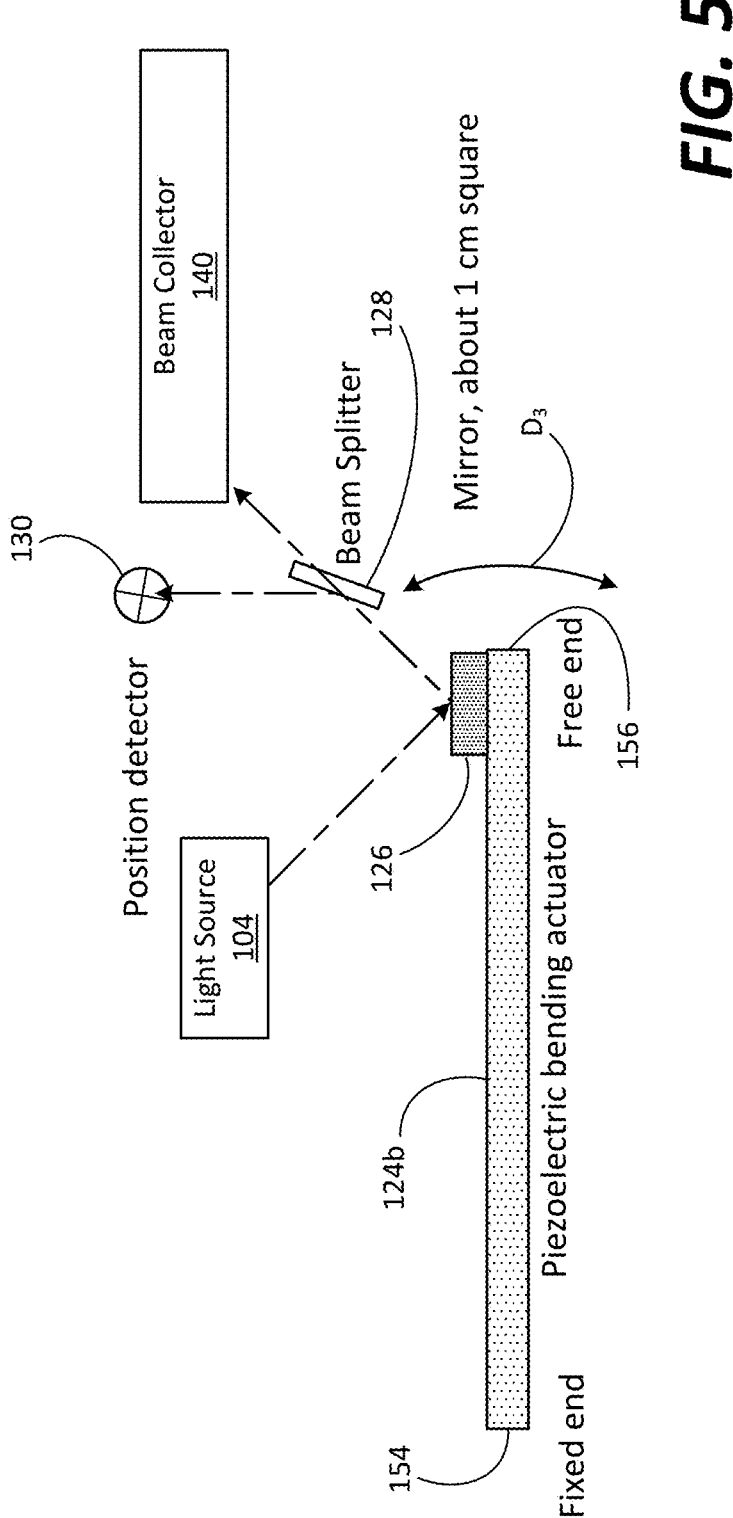
FIG. 5 is a top view of the example of the alignment module shown in FIG. 4.
Figure 6:
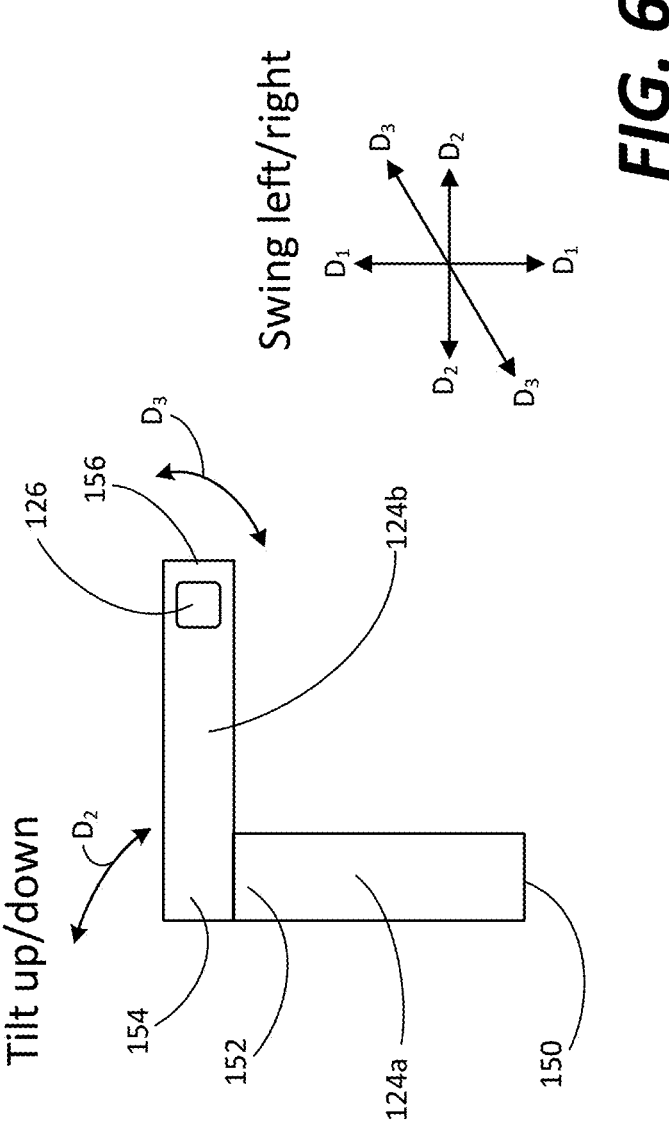
FIG. 6 is a side view of the example of the alignment module shown in FIG. 4.

FIGS. 5 and 6 are respective top and side views of the first and second alignment actuators 124a, 124b. As shown in FIG. 6, the first alignment actuator 124a extends in a first axial direction $D_1$ and the second alignment actuator 124b extends in a second axial direction $D_2$. The first and second axial directions $D_1$, $D_2$ are orthogonal. In the example shown in FIGS. 4-6, the first axial direction $D_1$ is vertical and the second axial direction $D_2$ is horizontal.

As shown in FIGS. 5 and 6, the first alignment actuator 124a has a fixed end 150 and a free end 152. Similarly, the second alignment actuator 124b has a fixed end 154 and a free end 156. In one embodiment, the first and second alignment actuators 124a, 124b are piezoelectric bending actuators, and the fixed ends 150, 154 are each attached to a closed loop control circuit 160 (see FIG. 7). The fixed ends 150, 154 can each receive a voltage value causing the respective free ends 152, 156 of the first and second alignment actuators 124a, 124b to bend in one or more directions. For example, the free end 152 of the first alignment actuator 124a can tilt up and down in the second axial direction $D_2$ depending on the voltage value received by the fixed end 150. Additionally, the second alignment actuator 124b can swing from side to side in a third axial direction $D_3$ depending on the voltage value received by the fixed end 154.

The mirror 126 is attached to at least one of the first and second alignment actuators 124a, 124b. In the example shown in FIGS. 4 and 5, the mirror is attached to the free end 156 of the second alignment actuator 124b. Thus, the position of the mirror 126 can tilt up and down and swing side to side to adjust the alignment of the light beam LB directed to the fluid steam F based on the voltage values received by the fixed ends 150, 154.

In alternative embodiments, the mirror 126 can be tilted up and down and can be swung from side to side using pico-motor actuators. In further embodiments, the mirror 126 can be tilted up and down and can be swung from side to side using piezo pushing actuators.

Figure 7:
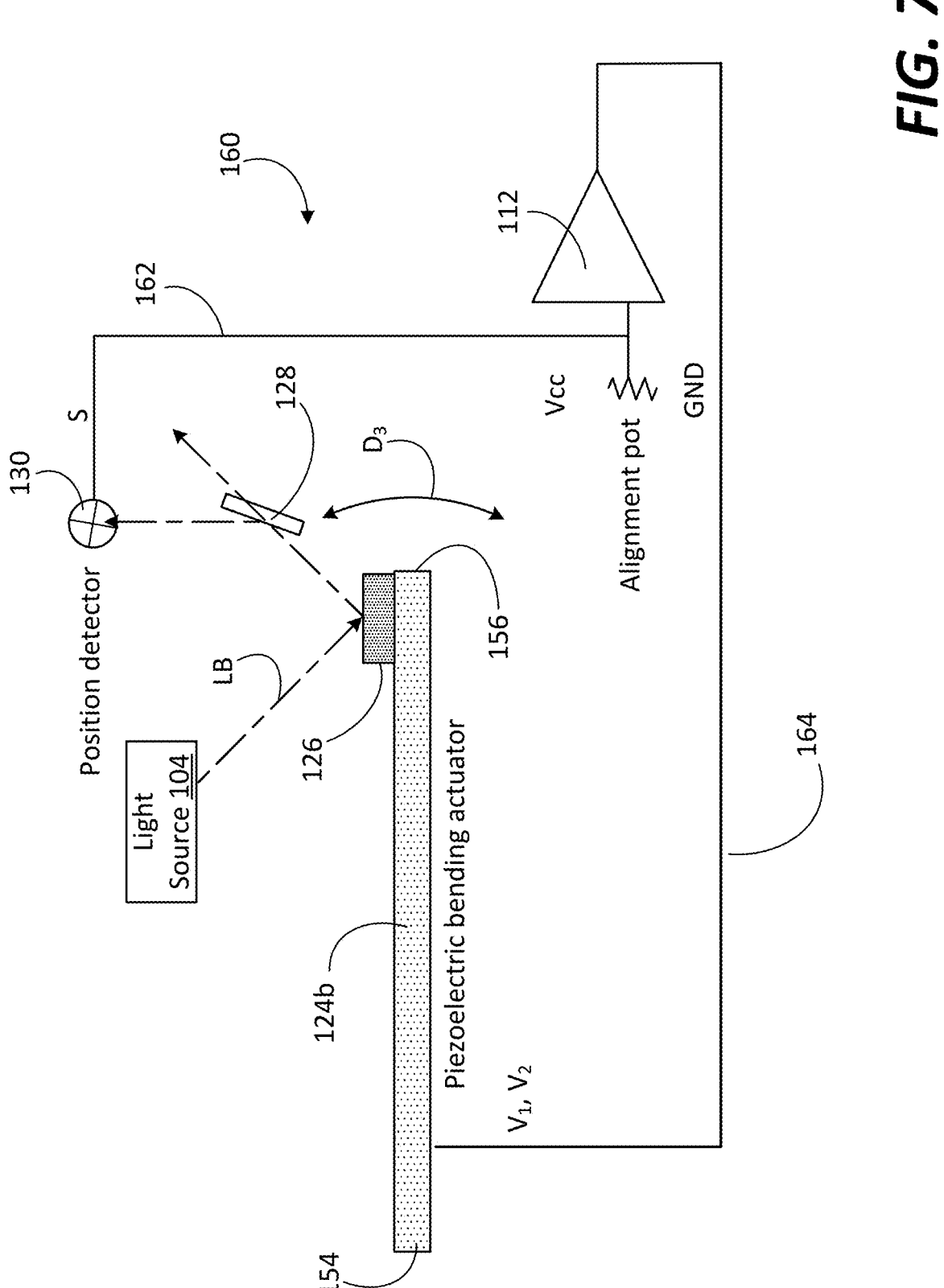
FIG. 7 is a schematic illustration of an example of a closed loop control circuit of the alignment module shown in FIG. 4.

FIG. 7 is a schematic top view of an example of a closed loop control circuit 160 included in the alignment module 122. The closed loop control logic 118 (stored in the memory device 116 of the controller 112) can be implemented through the closed loop control circuit 160 to maintain a target alignment of the light beam LB based on feedback received from the position sensor 130 during operation of the sorting flow cytometer 14. The closed loop control logic 118 can maintain the target alignment when drift from the light source 104 or the first and second alignment actuators 124a, 124b causes the light beam LB to misalign over time.

As shown in FIG. 7, the light source 104 emits the light beam LB toward the mirror 126 which is attached to the free end 156 of the second alignment actuator 124b. The mirror 126 reflects the light beam LB to the beam splitter 128 which reflects a portion of the light beam LB (e.g., 1-4%) to the position sensor 130, and allows a remaining portion of the light beam LB (e.g., 96%-99%) to pass through (such as to reach the beam collector 140 shown in FIG. 4).

The position sensor 130 sends a signal S via wiring 162 to the controller 112. The signal S represents the current alignment of the light beam LB directed to the fluid steam F. In this example, the signal S is based on the reflected portion of the light beam LB such that the position sensor 130 is an optical sensor that provides optical feedback. The signal S can include both a vertical alignment component (along the first axial direction $D_1$) and a horizontal alignment component (along the second axial direction $D_2$).

The controller 112 compares the current alignment of the light beam LB with a target alignment of the light beam LB, and calculates one or more voltage values V to adjust the positions of the first and second alignment actuators 124a, 124b to reduce or eliminate differences between the current and target alignments of the light beam LB.

In the example shown in FIG. 7, the controller 112 generates a first voltage value $V_1$ that is sent to the fixed end 154 of the second alignment actuator 124b via wiring 164. The first voltage value $V_1$ causes the free end 156 of the second alignment actuator 124b to swing in the third axial direction $D_3$, and thereby swing the mirror 126 left or right. The first voltage value $V_1$ can be used to reduce or eliminate the difference between the current alignment of the light beam LB and the target alignment of the light beam LB in the second axial direction $D_2$.

The controller 112 also generates a second voltage value $V_2$ that is sent to the fixed end 150 of the first alignment actuator 124$a$ via wiring in the closed loop control circuit 160. The second voltage value $V_2$ causes the free end 152 of the first alignment actuator 124$a$ to tilt in the second axial direction $D_2$, and thereby tilt the mirror 126 up or down. The second voltage value $V_2$ can be used to reduce or eliminate the difference between the current alignment of the light beam LB and the target alignment of the light beam LB in the first axial direction $D_1$.

Figure 8:
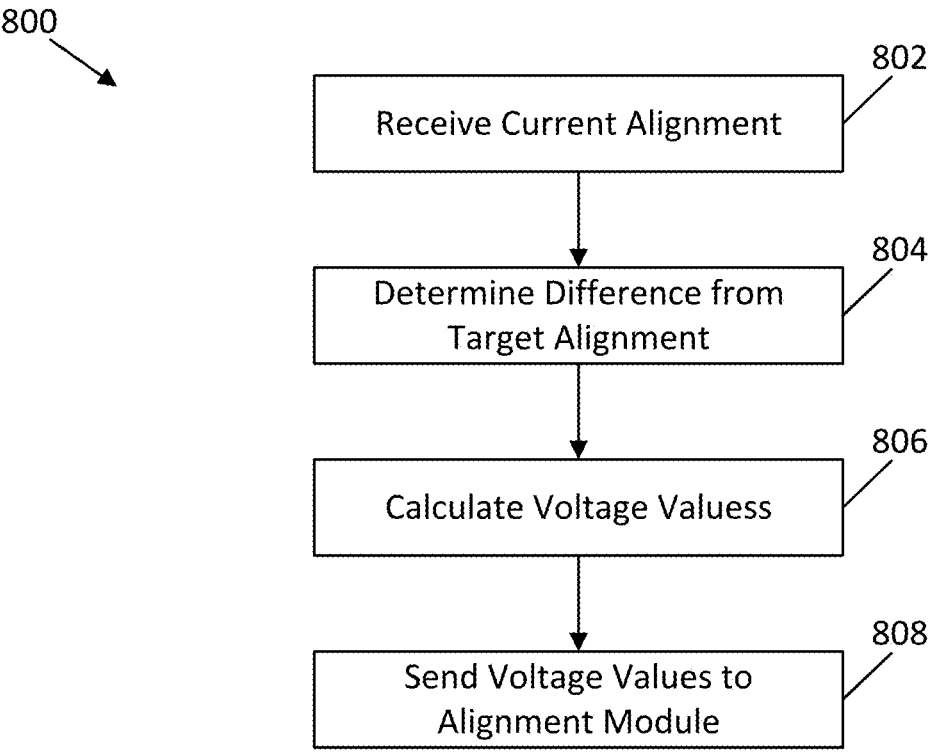
FIG. 8 illustrates a method of aligning light beam emitted from the light source of the sorting flow cytometer of FIG. 3.

FIG. 8 illustrates a method 800 of aligning the light beam LB emitted from the light source 104 toward the fluid steam F. The method 800 can be performed by the controller 112 in communication with the components of the alignment module 122 described above.

The method 800 includes an operation 802 of receiving a current alignment of the light beam LB from the position sensor 130. In one embodiment, the current alignment of the light beam LB can be determined from the portion of the light beam LB that is received by the position sensor 130 from the beam splitter 128. In this embodiment, the position sensor 130 is an optical sensor. In an alternative embodiment, such as in the embodiment shown in FIGS. 9 and 10, the current alignment of the light beam LB can be determined from a strain gauge 170.

In the embodiment where the position sensor 130 is an optical sensor, the position sensor 130 can communicate a raw optical signal to the controller 112, and the controller 112 processes the raw optical signal into a digital value that represents the current alignment of the light beam LB with respect to the fluid steam F. Alternatively, the position sensor 130 can convert the raw optical signal into the digital value that represents the current alignment of the light beam LB with respect to the fluid steam F, and then communicates the digital value to the controller 112. The digital value can include both a vertical alignment component (along the first axial direction $D_1$) and a horizontal alignment component (along the second axial direction $D_2$).

Next, the method 800 includes an operation 804 of determining a difference between the current alignment of the light beam LB and a target alignment of the light beam LB. In one example, the target alignment is a previous alignment stored in the memory device 116 of the controller 112. In other examples, the target alignment is an optimal alignment such as one that provides a strongest signal for analysis by the sensor analyzer 110 and controller 112.

Next, the method 800 includes an operation 806 of calculating one or more voltage values based on the difference between the current alignment of the light beam LB and the target alignment of the light beam LB. Operation 806 can include calculating a first voltage value configured to tilt the free end 152 of the first alignment actuator 124$a$ in the second axial direction $D_2$ (see FIG. 6) based on a difference in the first axial direction $D_1$ between the current alignment of the light beam LB and the target alignment of the light beam LB. As described above, the first axial direction $D_1$ is vertical such that the first voltage tilts the free end 152 of first alignment actuator 124$a$ (and the mirror 126) up or down depending on the difference between the current and target alignments of the light beam LB in the first axial direction $D_1$.

Operation 806 can include also calculating a second voltage value configured to swing the free end 156 of the second alignment actuator 124$b$ in the third axial direction $D_3$ (see FIGS. 5 and 6) based on a difference in the second axial direction $D_2$ between the current alignment of the light beam LB and the target alignment of the light beam LB. The second axial direction $D_2$ is horizontal such that the second voltage swings the free end 156 of second alignment actuator 124$b$ (and the mirror 126) left or right depending on the difference between the current and target alignments of the light beam LB in the second axial direction $D_2$.

Next, the method 800 includes an operation 808 of sending the one or more voltage values to the alignment module 122 to adjust a position of at least one of the first and second alignment actuators 124$a$, 124$b$ to reduce the difference between the current alignment of the light beam LB and the target alignment of the light beam LB. In some instances, the voltage values are sent from the controller 112 to a digital-to-analog converter that converts the voltage values into an analog signal that drives the first and second alignment actuators 124$a$, 124$b$. As described above, the first and second alignment actuators 124$a$, 124$b$ can be piezoelectric bending actuators such that voltage values cause the actuators to bend in one or more directions. In other examples, the first and second alignment actuators 124$a$, 124$b$ can be pico-motor actuators, piezo pushing actuators, or other similar type of actuators.

Figure 9:
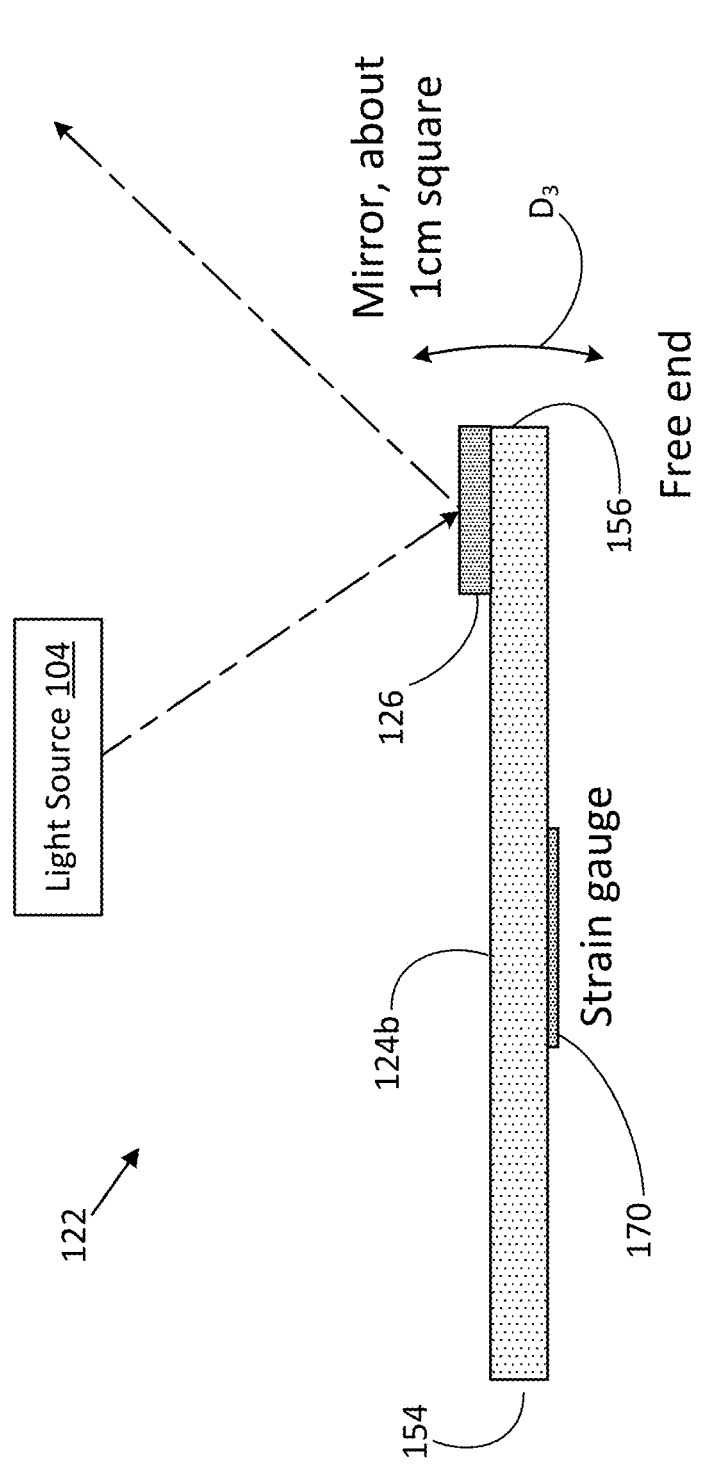
FIG. 9 is a top view of another example of an embodiment of the alignment module that can be used in the sorting flow cytometer of FIG. 2.
Figure 10:
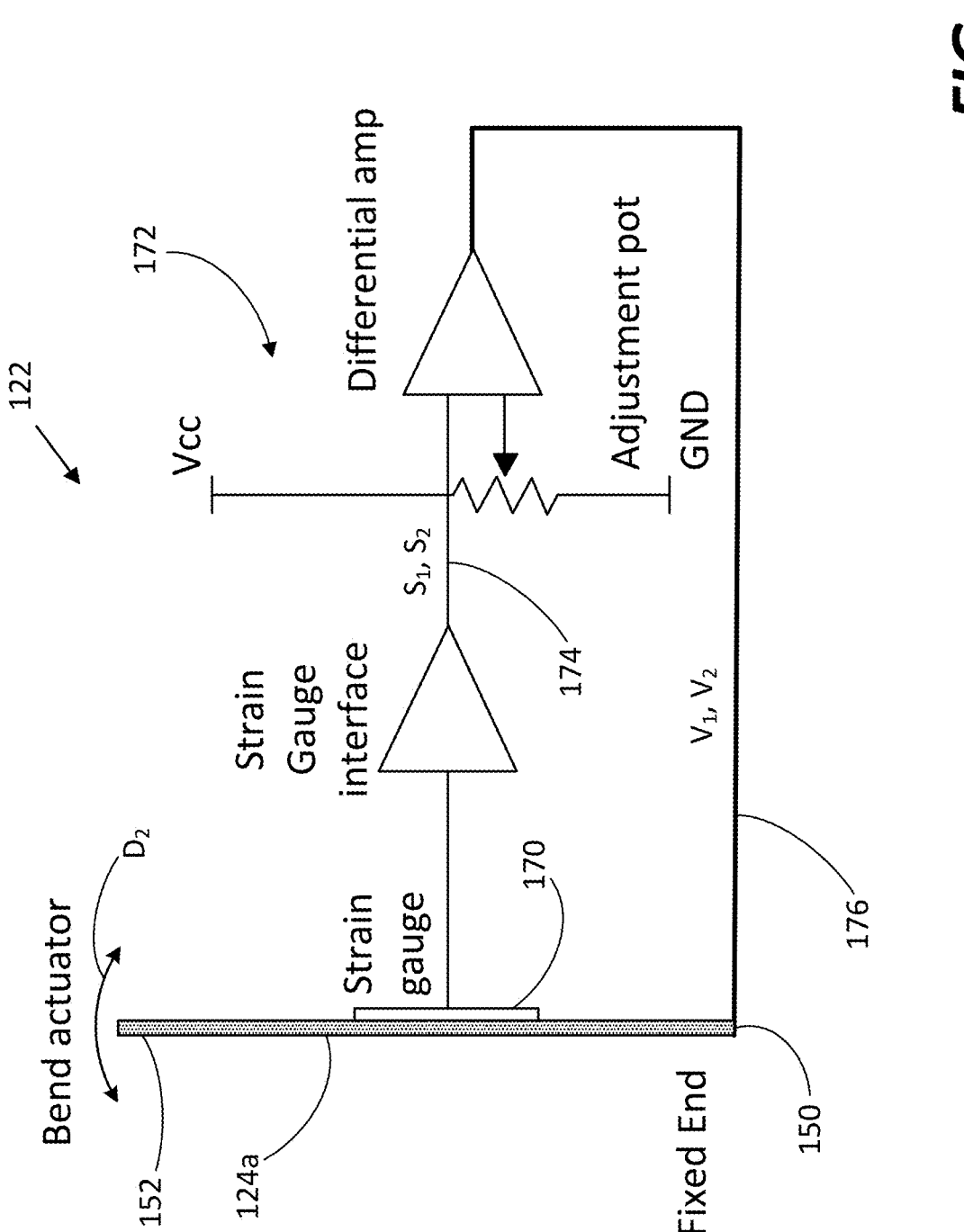
FIG. 10 is a schematic illustration of an example of a closed loop control circuit of the embodiment of the alignment module shown in FIG. 9.

FIGS. 9 and 10 are respective top and side views of another embodiment of the alignment module 122 that can be used in the sorting flow cytometer 14. In this embodiment, the alignment module 122 includes strain gauges 170 which acts as a position sensor that can be used to measure the current alignment of the light beam LB from the light source 104 relative to the fluid steam F. In this embodiment, the strain gauge 170 can replace the beam splitter 128 and position sensor 130 shown in FIG. 4, such that they are not part of the alignment module 122. While FIG. 9 shows a strain gauge 170 attached to the second alignment actuator 124$b$, the first alignment actuator 124$a$ can also include a separate strain gauge 170 attached thereto.

Referring now to FIG. 10, the closed loop control logic 118 (stored in the memory device 116 of the controller 112) can be implemented through a closed loop control circuit 172 to perform methods of adjusting the alignment of the light beam LB directed to the fluid steam F. For example, the strain gauges 170 each respectively send a signal $S_1$, $S_2$ via wiring 174 to the controller 112. In the example shown in FIG. 10, the signal $S_1$ represents the degree of bend by the free end 152 of the first alignment actuator 124$a$ (and hence the current alignment of the light beam LB directed to the fluid steam F in the first axial direction $D_1$). The strain gauge 170 attached to the second alignment actuator 124$b$ can also send a signal $S_2$ that represents the degree of bend by the free end 156 of the second alignment actuator 124$b$ (and hence the current alignment of the light beam LB directed to the fluid steam F in the second axial direction $D_2$).

Like in the embodiment described above with respect to FIGS. 4-7, the controller 112 compares the current alignment of the light beam LB with a target alignment of the light beam LB, and calculates first and second voltage values $V_1$, $V_2$ to adjust the positions of the first and second alignment actuators 124$a$, 124$b$ to reduce or eliminate differences between the current and target alignments of the light beam LB. The first and second voltage values $V_1$, $V_2$ can be sent to the fixed ends 150, 154 of the first and second alignment actuators 124$a$, 124$b$ via wiring 176 to adjust the amount of bending by the respective free ends 152, 156 of the first and second alignment actuators 124$a$, 124$b$, and to thereby adjust the alignment of the light beam LB reflected by the mirror 126 toward the fluid steam F inside the sorting flow cytometer 14.

Figure 11:
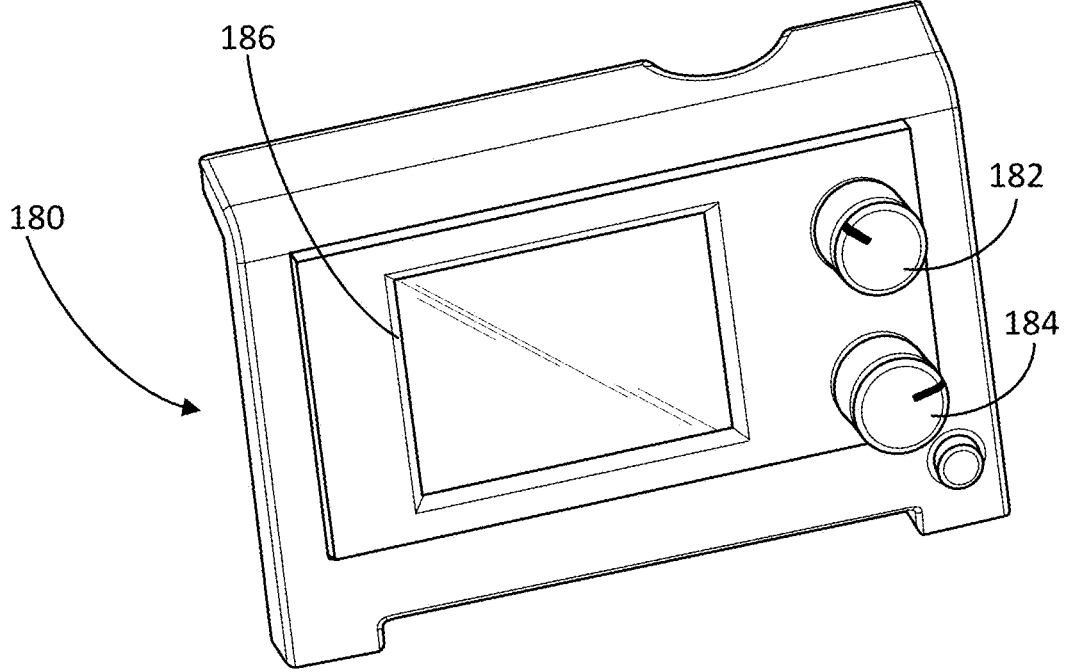
FIG. 11 is a perspective view of an example of a user interface of the sorting flow cytometer of FIG. 3.
Figure 12:
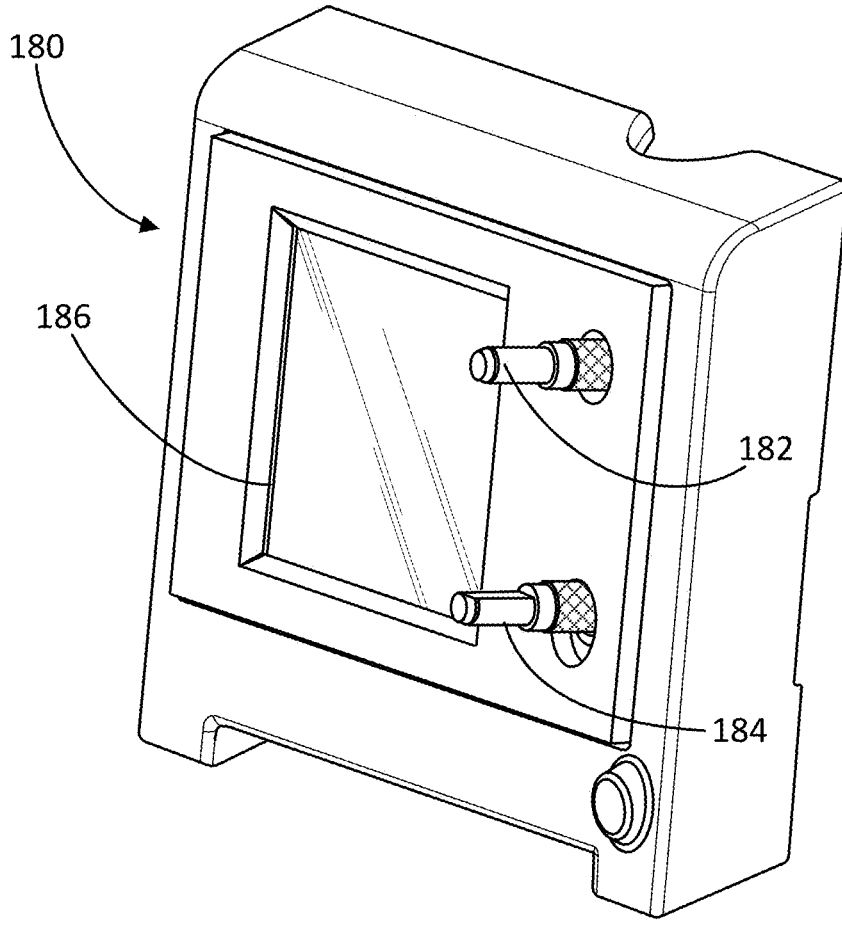
FIG. 12 is another perspective view of the user interface of FIG. 10 with caps of rotatable knobs removed from the user interface.

FIGS. 11 and 12 are perspective views of an example of the user interface 180 of the sorting flow cytometer 14. In some examples, the user interface 180 replaces the display 16 of the flow cytometer system 10 shown in FIG. 1. In other examples, the user interface 180 supplements the display 16 such that it is separately included on the sorting flow cytometer 14.

As shown in FIGS. 11 and 12, the user interface 180 includes a first input device 182 that is configured for use by a user to adjust a first alignment component (e.g., a vertical alignment component) of the light beam LB from the light source 104, and a second input device 184 that is configured for use by the user to adjust a second alignment component (e.g., a horizontal alignment component) of the light beam LB from the light source 104. In the example shown in FIG. 11, the first and second input devices 182, 184 are rotatable knobs. FIG. 12 shows the caps of the rotatable knobs removed from the user interface 180.

The user interface 180 further includes a display device 186 that is configured to display a graphical user interface that displays the current alignment and the target alignment of the light beam LB. In some instances, the target alignment of the light beam LB is a previous alignment stored in the memory device 116 of the controller 112. In other examples, the target alignment is an optimal alignment such as one that provides a strongest feedback signal for analysis by the sensor analyzer 110 and controller 112.

The display device 186 is configured to update the position of the current alignment of the light beam LB relative to the target alignment based on the adjustments of the vertical and horizontal alignments received from the first and second input devices 182, 184. The user interface 180 allows the user to tune and/or calibrate the sorting flow cytometer 14 to have the target alignment for the light beam LB from the light source 104.

The display device 186 can also display a power level of the light beam LB relative to upper and lower power level limits. In one example, the user can use the first and second input device 182, 184 to adjust the power level of the light beam LB emitted from the light source 104. Alternatively, the user interface 180 can include dedicated input devices (i.e., one or more pushbuttons) that allow the use to adjust the power level of the light beam LB emitted from the light source 104. In another example, the display device 186 is a touchscreen that allows the user to adjust the power level of the light beam LB emitted from the light source 104.

Figure 13:
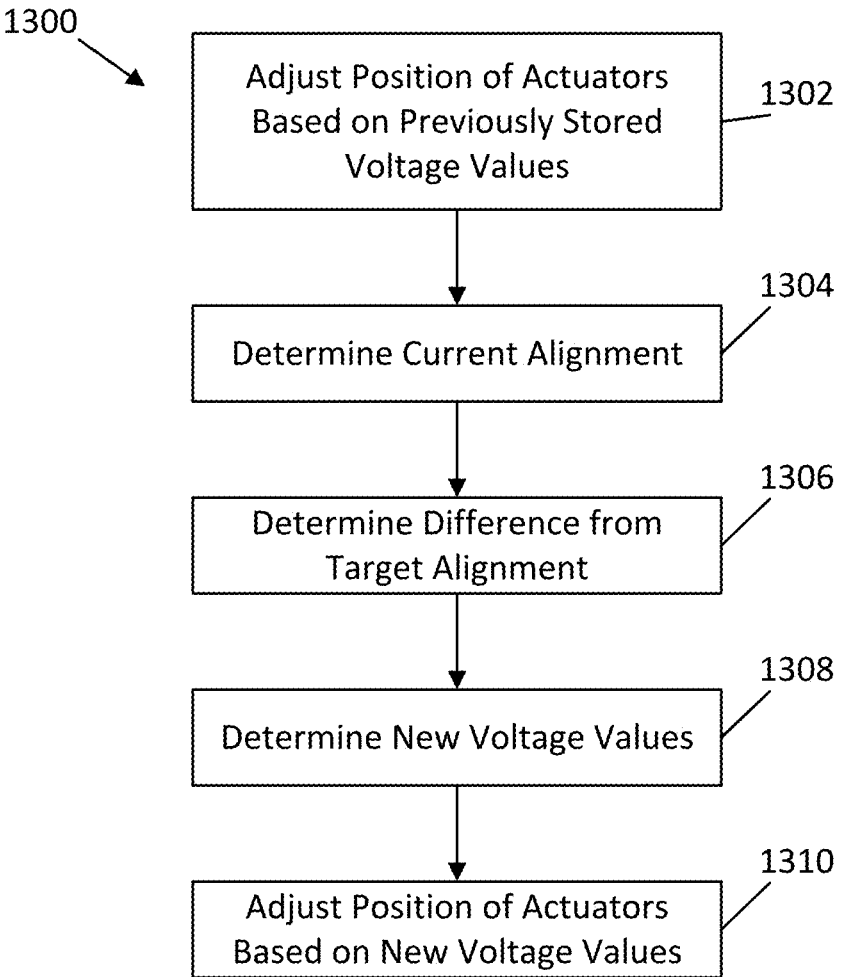
FIG. 13 illustrates a method of providing a closed loop control circuit for the sorting flow cytometer of FIG. 3.

FIG. 13 illustrates a method 1300 of providing a closed loop control circuit for the sorting flow cytometer 14. The method 1300 can mitigate the effects caused by subtle shifts in the position of the light beam LB emitted from the light source 104 over time. For example, the light beam LB emitted from the light source 104 may shift due to movement of the light source 104 and/or temperature changes. Also, the position of the first and second alignment actuators 124a, 124b can creep over time causing the position of the mirror 126 to change. Additional optical components inside the sorting flow cytometer 14 may also shift their position over time causing misalignment of the light beam LB with respect to the fluid steam F.

The method 1300 includes an operation 1302 of adjusting a position of the first and second alignment actuators 124a, 124b based on previously stored voltage values. For examples, the previously stored voltage values can be stored in the memory device 116 of the controller 112 during a previous use of the sorting flow cytometer 14. The previously stored voltage values can include a first voltage value $V_1$ for vertical alignment along the first axial direction $D_1$, and a second voltage value $V_2$ for horizontal alignment along the second axial direction $D_2$.

Next, the method 1300 includes an operation 1304 of determining a current alignment of the light beam LB with respect to the fluid steam F. The current alignment of the light beam LB can be determined using the position sensor 130 included in the embodiment shown in FIGS. 4-7, or by the strain gauges 170 included in the embodiment shown in FIGS. 9 and 10.

Next, the method 1300 includes an operation 1306 of determining a difference of the current alignment of the light LB with a target alignment of the light beam. The difference between the current alignment and target alignment can be calculated in accordance with the examples described above, such as in the operation 804 of the method 800.

Next, the method 1300 includes an operation 1308 of determining new voltage values based on the difference between the current and target alignments. The new voltage values can similarly include a first voltage value $V_2$ for vertical alignment along the first axial direction $D_1$, and a second voltage value $V_2$ for horizontal alignment along the second axial direction $D_2$. The new voltage values can be different from the previously stored voltage values to compensate for subtle shifts in the alignment of the light beam LB with respect to the fluid steam F. In some instances, both of the new first and second voltage values are different from the previously stored first and second voltage values. In other instances, only one of the new first and second voltage values is different from the previously stored first and second voltage values.

Next, the method 1300 includes an operation 1310 of adjusting the position of the first and second alignment actuators 124a, 124b based on the new voltage values. As described above, the fixed ends 150, 154 can each receive a voltage value causing the respective free ends 152, 156 of the first and second alignment actuators 124a, 124b to bend in one or more directions. For example, the free end 152 of the first alignment actuator 124a can tilt up and down in the second axial direction $D_2$ depending on the voltage value received by the fixed end 150. Additionally, the second alignment actuator 124b can swing from side to side in a third axial direction $D_3$ depending on the voltage value received by the fixed end 154.

FIG. 14 illustrates a method 1400 of storing a new alignment of the light beam LB emitted from the light source 104 of the sorting flow cytometer 14. The method 1400 can be performed by the controller 112 without requiring any input from the user of the sorting flow cytometer 14 such that the new alignment is automatically stored without user input.

The method 1400 includes an operation 1402 of monitoring adjustments of the alignment of the light beam LB. Operation 1402 can include detecting signals received from the first and second input devices 182, 184 of the user interface 180 shown in FIGS. 11 and 12. The signals received from the first and second input devices 182, 184 indicate that a user of the sorting flow cytometer 14 is adjusting the alignment of the light beam LB.

Next, the method 1400 includes an operation 1404 of detecting completion of a new alignment for the light beam LB. FIG. 15 illustrates an example of the operation 1404, which can include a step 1502 of detecting a change in alignment of the light beam LB. For example, step 1502 can include receiving one or more commands from the first and second input devices 182, 184 that indicate a change in alignment of the light beam LB. Next, operation 1404 can include a step 1504 of checking the alignment of the light beam LB after a predetermined delay. In some examples, the predetermined delay is about 5 minutes. Next, operation 1404 can include a step 1506 of determining whether the alignment of the light beam LB has changed after the predetermined delay. When the alignment has changed after the predetermined delay (i.e., "Yes" at step 1506), operation 1404 can return to step 1504 of checking the alignment of the light beam LB after a predetermined delay. When the alignment has not changed after the predetermined delay (i.e., "No" at step 1506), operation 1404 is complete because it is likely that the new alignment is finished, and the method 1400 can proceed to operation 1406.

Referring back to FIG. 14, operation 1406 includes determining whether the new alignment is stored in the memory device 116 of the sorting flow cytometer 14. When the new alignment is already stored in the memory device 116 (i.e., "Yes" at operation 1406), the method 1400 can return to operation 1402 of monitoring adjustments of the alignment of the light beam LB. When the new alignment is not already stored in the memory device 116 (i.e., "No" at operation 1406), the method 1400 proceeds to operation 1408 of storing the new alignment adjustment of the light beam LB. As described above, the new alignment adjustment of the light beam LB can be stored without any input from the user of the sorting flow cytometer 14. The new alignment adjustment can include a first voltage value $V_1$ for a first alignment component of the light beam LB (e.g., a vertical alignment component), and a second voltage value $V_2$ for a second alignment component (e.g., a horizontal alignment component).

Certain embodiments of the invention include:

Embodiment 1. A sorting flow cytometer comprising a light source configured to generate a light beam for measuring at least one characteristic of a particle arranged in a fluid stream. An alignment module is configured to adjust an alignment of the light beam from the light source, the alignment module including: a first alignment actuator extending in a first axial direction; a second alignment actuator extending in a second axial direction; a mirror attached to at least one of the first and second alignment actuators, the mirror configured to reflect the light beam generated from the light source; a beam splitter configured to reflect a portion of the light beam received from the mirror, and the beam splitter being configured to allow a remaining portion of the light beam received from the mirror to pass through; and a position sensor configured to receive the portion of the light beam reflected from the beam splitter to determine a current alignment of the light beam. A controller includes at least one processing device and at least one memory device storing software instructions that, when executed by the at least one processing device, cause the controller to: receive the current alignment of the light beam from the position sensor; determine a difference between the current alignment of the light beam and a target alignment of the light beam; calculate one or more voltage values based on the difference between the current alignment of the light beam and the target alignment of the light beam; and send the one or more voltage values to the alignment module to adjust a position of at least one of the first and second alignment actuators to reduce the difference between the current and target alignments of the light beam.

Embodiment 2. The sorting flow cytometer of Embodiment 1, wherein the controller is configured to: generate a first voltage configured to tilt the first alignment actuator in the second axial direction based on a difference in the first axial direction between the current alignment of the light beam and the target alignment of the light beam.

Embodiment 3. The sorting flow cytometer of Embodiment 2, wherein the first axial direction is vertical such that the first voltage tilts the first alignment actuator up or down.

Embodiment 4. The sorting flow cytometer of Embodiments 2 or 3, wherein the controller is configured to: generate a second voltage configured to swing the second alignment actuator in a third axial direction based on a difference in the second axial direction between the current alignment of the light beam and the target alignment of the light beam.

Embodiment 5. The sorting flow cytometer of Embodiment 4, wherein the second axial direction is horizontal such that the second voltage swings the second alignment actuator left or right.

Embodiment 6. The sorting flow cytometer of Embodiment 1, wherein the first and second alignment actuators are piezoelectric bending actuators.

Embodiment 7. The sorting flow cytometer of Embodiment 1, wherein the target alignment is a previous alignment of the light beam stored in a memory device of the controller.

Embodiment 8. The sorting flow cytometer of Embodiment 1, wherein the controller is configured to provide closed loop control to maintain the target alignment of the light beam based on optical feedback received from the position sensor during operation of the sorting flow cytometer.

Embodiment 9. The sorting flow cytometer of Embodiment 1, further comprising: a user interface including: a first input device being configured for use by a user to adjust a vertical alignment of the light beam from the light source; a second input device being configured for use by a user to adjust a horizontal alignment of the light beam from the light source; and a display device configured to display a graphical user interface showing the current alignment, the target alignment, and wherein the display device is configured to show adjustments of the vertical and horizontal alignments of the light beam that move the current alignment relative to the target alignment by use of the first and second input devices.

Embodiment 10. The sorting flow cytometer of Embodiment 9, wherein the first and second input devices are rotatable knobs.

Embodiment 11. The sorting flow cytometer of Embodiment 10, wherein the display device is further configured to display a power level of the light beam relative to upper and lower power level limits, and the user interface allows the user to adjust the power level of the light beam.

Embodiment 12. A method of aligning a light beam in a sorting flow cytometer, the method comprises receiving a current alignment of a light beam; determining a difference between the current alignment of the light beam and a target alignment of the light beam in at least one of first and second axial directions; calculating one or more voltage values based on the difference between the current alignment of the light beam and the target alignment of the light beam; and using the one or more voltage values to adjust a position of at least one of a first alignment actuator extending in the first axial direction and a second alignment actuator extending in the second axial direction to reduce the difference between the current alignment of the light beam and the target alignment of the light beam.

Embodiment 13. The method of Embodiment 12, further comprising: generating a first voltage configured to tilt the first alignment actuator in the second axial direction based on a difference in the first axial direction between the current alignment of the light beam and the target alignment of the light beam.

Embodiment 14. The method of Embodiment 13, wherein the first axial direction is vertical such that the first voltage tilts the first alignment actuator up or down.

Embodiment 15. The method of Embodiments 13 or 14, further comprising: generating a second voltage configured to swing the second alignment actuator in a third axial direction based on a difference in the second axial direction between the current alignment of the light beam and the target alignment of the light beam.

Embodiment 16. The method of Embodiment 15, wherein the second axial direction is horizontal such that the second voltage swings the second alignment actuator left or right.

Embodiment 17. The method of Embodiment 12, further comprising: providing closed loop control to maintain the target alignment of the light beam based on feedback received during operation of the sorting flow cytometer.

Embodiment 18. The method of Embodiment 17, wherein the feedback is received from an optical sensor.

Embodiment 19. The method of Embodiment 17, wherein the feedback is received from a strain gauge.

Embodiment 20. A controller for a sorting flow cytometer, the controller comprising: at least one processing device; and at least one computer readable data storage device storing software instructions that, when executed by the at least one processing device, cause the controller to: receive a current alignment of a light beam; determine a difference between the current alignment of the light beam and a target alignment of the light beam in at least one of first and second axial directions; generate one or more voltage values based on the difference between the current alignment of the light beam and the target alignment of the light beam; and use the one or more voltage values to adjust a position of at least one of a first alignment actuator extending in the first axial direction and a second alignment actuator extending in the axial second direction to reduce the difference between the current alignment of the light beam and the target alignment of the light beam.

Embodiment 21. The controller of Embodiment 20, wherein the software instructions, when executed by the at least one processing device, further cause the controller to: generate a first voltage configured to tilt the first alignment actuator in the second axial direction based on a difference in the first axial direction between the current alignment of the light beam and the target alignment of the light beam.

Embodiment 22. The controller of Embodiment 21, wherein the first axial direction is vertical such that the first voltage tilts the first alignment actuator up or down.

Embodiment 23. The controller of Embodiment 21 or 22, wherein the software instructions, when executed by the at least one processing device, further cause the controller to: generate a second voltage configured to swing the second alignment actuator in a third axial direction based on a difference in the second axial direction between the current alignment of the light beam and the target alignment of the light beam.

Embodiment 24. The controller of Embodiment 23, wherein the second axial direction is horizontal such that the second voltage swings the second alignment actuator left or right.

Embodiment 25. The controller of Embodiment 20, wherein the first and second axial directions are orthogonal.

Embodiment 26. The controller of Embodiment 20, wherein the target alignment is a previous alignment of the light beam stored in a memory of the controller.

Embodiment 27. The controller of Embodiment 20, wherein the controller is configured to provide closed loop control to maintain the target alignment of the light beam based on feedback received during operation of the sorting flow cytometer.

Embodiment 28. The controller of Embodiment 27, wherein the feedback is received from an optical sensor.

Embodiment 29. The controller of Embodiment 27, wherein the feedback is received from a strain gauge.

Embodiment 30. The controller of Embodiment 20, wherein the software instructions, when executed by the at least one processing device, further cause the controller to: receive inputs adjusting a vertical alignment of the light beam; receive inputs adjusting a horizontal alignment of the light beam; display a graphical user interface showing the current alignment and the target alignment; and update the graphical user interface to show adjustments of the vertical and horizontal alignments of the light beam moving the current alignment relative to the target alignment.

Embodiment 31. An alignment module for adjusting an alignment of a light beam from a light source inside a sorting flow cytometer, the alignment module comprising: a first alignment actuator having a fixed end and a free end extending in a first axial direction, the fixed end of the first alignment actuator configured to receive a first voltage to adjust a position of the first alignment actuator orthogonal to the first axial direction; a second alignment actuator having a fixed end and a free end extending in a second axial direction, the second axial direction being orthogonal to the first axial direction, and the fixed end of the second alignment actuator configured to receive a second voltage to adjust a position of the second alignment actuator orthogonal to the second axial direction; and a mirror attached to at least one of the first and second alignment actuators, the mirror configured to reflect the light beam generated from the light source.

Embodiment 32. The alignment module of Embodiment 31, wherein the first voltage tilts the first alignment actuator in the second axial direction based on a difference in the first axial direction between a current alignment of the light beam and a target alignment of the light beam.

Embodiment 33. The alignment module of Embodiment 32, wherein the first axial direction is vertical such that the first voltage tilts the first alignment actuator up or down.

Embodiment 34. The alignment module of Embodiments 32 or 33, wherein the second voltage swings the second alignment actuator in a third axial direction based on a difference in the second axial direction between the current alignment and the target alignment of the light beam.

Embodiment 35. The alignment module of Embodiment 34, wherein the second axial direction is horizontal such that the first voltage swings the second alignment actuator left or right Embodiment 36. The alignment module of Embodiment 31, wherein the first and second alignment actuators are piezoelectric bending actuators.

Embodiment 37. The alignment module of Embodiment 31, wherein the free end of the first alignment actuator is coupled to the fixed end of the second alignment actuator.

Embodiment 38. A method of aligning a light beam in a sorting flow cytometer, the method comprising: adjusting a position of one or more actuators based on previously stored voltage values, the one or more actuators guiding an alignment of a light beam; receiving feedback on a current alignment of the light beam; calculating a difference between the current alignment of the light beam and a target alignment of the light beam; determining new voltage values for adjusting the position of the one or more actuators based on the difference between the current alignment and the target alignment; and adjusting the position of the one or more actuators based on the new voltage values to reduce the difference between the current alignment and the target alignment.

Embodiment 39. The method of Embodiment 38, wherein the target alignment is a previous alignment of the light beam stored in at least one computer readable data storage device.

Embodiment 40. The method of Embodiment 38, wherein the feedback on the current alignment is received from an optical sensor.

Embodiment 41. The method of Embodiment 38, wherein the feedback on the current alignment is received from a strain gauge.

Embodiment 42. A method of aligning a light beam in a sorting flow cytometer, the method comprising: determining when a user completes alignment adjustment of the light beam; determining whether the alignment adjustment is stored in a memory of the sorting flow cytometer; and when the alignment adjustment is not stored in the memory of the sorting flow cytometer, storing the alignment adjustment in the memory of the sorting flow cytometer without user input.

Embodiment 43. The method of Embodiment 42, wherein the step of determining when the user completes the adjustment of the alignment of the light beam includes: detecting a change in alignment of the light beam; checking alignment of the light beam after a predetermined delay; and determining no change in alignment after the predetermined delay.

Embodiment 44. The method of Embodiment 43, wherein the predetermined delay is 5 minutes.

The various embodiments described above are provided by way of illustration only and should not be construed to be limiting in any way. Various modifications can be made to the embodiments described above without departing from the true spirit and scope of the disclosure.

What is claimed is:

1. An alignment module for adjusting an alignment of a light beam from a light source inside a sorting flow cytometer, the alignment module comprising:
    a first alignment actuator having a fixed end and a free end extending in a first axial direction, the fixed end of the first alignment actuator configured to receive a first voltage to adjust a position of the first alignment actuator orthogonal to the first axial direction by tilting the first alignment actuator in a second axial direction based on a difference in the first axial direction between a current alignment of the light beam and a target alignment of the light beam, the second axial direction being orthogonal to the first axial direction;
    a second alignment actuator having a fixed end and a free end extending in the second axial direction, and the fixed end of the second alignment actuator configured to receive a second voltage to adjust a position of the second alignment actuator orthogonal to the second axial direction by swinging the second alignment actuator in a third axial direction based on a difference in the second axial direction between the current alignment and the target alignment of the light beam;
    a controller including at least one processing device and at least one memory device storing software instructions that, when executed by the at least one processing device, causes the controller to store a new alignment position based on the difference in the first axial direction and the difference in the second axial direction; and
    a mirror attached to at least one of the first and second alignment actuators, the mirror configured to reflect the light beam generated from the light source.

2. The alignment module of claim 1, wherein the first axial direction is vertical such that the first voltage tilts the first alignment actuator up or down.

3. The alignment module of claim 1, wherein the second axial direction is horizontal such that the first voltage swings the second alignment actuator left or right.

4. The alignment module of claim 1, wherein the first and second alignment actuators are piezoelectric bending actuators.

5. The alignment module of claim 1, wherein the free end of the first alignment actuator is coupled to the fixed end of the second alignment actuator.

6. The alignment module of claim 1, wherein the controller is further configured to check alignment of the light beam after a predetermined delay.

7. The alignment module of claim 1, wherein the target alignment is a previous alignment of the light beam stored in at least one computer readable data storage device.

* * * * *